US012664563B2

(12) United States Patent
Rao et al.

(10) Patent No.: US 12,664,563 B2
(45) Date of Patent: Jun. 23, 2026

(54) IDENTIFYING ACTIONABLE INSIGHTS IN UNSTRUCTURED DATATYPES OF A SEMANTIC KNOWLEDGE DATABASE

(71) Applicant: Truist Bank, Charlotte, NC (US)

(72) Inventors: Ritesh A Rao, Woodridge, IL (US); Sparkle S. Douglas, Waxhaw, NC (US); Natalie Patrice Mabe, Charlotte, NC (US); Susanth Sampath Kumar Dasari, Atlanta, GA (US); Peter Councill, Richmond, VA (US); Krishnaveni Kavuri, Waxhaw, NC (US)

(73) Assignee: TRUIST BANK, Charlotte, NC (US)

( * ) Notice: Subject to any disclaimer, the term of this patent is extended or adjusted under 35 U.S.C. 154(b) by 8 days.

(21) Appl. No.: 18/748,287

(22) Filed: Jun. 20, 2024

(65) Prior Publication Data

US 2025/0139649 A1 May 1, 2025

Related U.S. Application Data

(60) Provisional application No. 63/594,688, filed on Oct. 31, 2023.

(51) Int. Cl.
G06Q 30/0203 (2023.01)
G06Q 10/0631 (2023.01)
(Continued)

(52) U.S. Cl.
CPC ... G06Q 30/0203 (2013.01); G06Q 10/06315 (2013.01); G06Q 10/0637 (2013.01); G06Q 30/0282 (2013.01)

(58) Field of Classification Search
USPC ....................................................... 705/7.32
See application file for complete search history.

(56) References Cited

U.S. PATENT DOCUMENTS 5,966,126 A * 10/1999 Szabo ................... G06F 16/338
707/E17.082
10,976,950 B1 * 4/2021 Trezzo ................... G06F 3/0652
(Continued)

OTHER PUBLICATIONS

No'aman, M. Ali, and Boris Novikov. "A multi-source big data framework for capturing and analyzing customer feedback." 2021 IEEE Conference of Russian Young Researchers in Electrical and Electronic Engineering (EIConRus). IEEE, 2021 (Year: 2021).*
(Continued)

*Primary Examiner* — Darlene Garcia-Guerra
(74) *Attorney, Agent, or Firm* — Michael A. Springs, Esq.; Shumaker, Loop & Kendrick, LLP; Patrick B. Horne

(57) ABSTRACT

An artificial intelligence (AI) system for use by a business to process multiple channels of user feedback data. User experience feedback data is provided via multiple channels—including structured feedback in the form of surveys, and unstructured and unsolicited feedback provided by people who wish to provide ad hoc feedback. The unstructured feedback may be from social media posts, calls to a service center, emails, and other sources. The feedback is aggregated as text data in a data pool. A natural language processing machine learning system is used to analyze the feedback and extract the meaning in human-understandable terms. Clustering techniques are used to identify commonalities in the feedback data even when issues are found in different data channels using different terminology. The commonalities are analyzed to identify actionable insights which address the underlying issues. Labeled sample data is used to perform supervised learning of the AI system.

11 Claims, 11 Drawing Sheets

(51) Int. Cl.
 *G06Q 10/0637*   (2023.01)
 *G06Q 30/0282*   (2023.01)

(56)     References Cited

U.S. PATENT DOCUMENTS

| | | | |
|---|---|---|---|
| 12,547,838 | B2 * | 2/2026 | Nakayama ............... G06F 40/30 |
| 2006/0085408 | A1 * | 4/2006 | Morsa .................... G06Q 30/02 |
| | | | 705/14.71 |
| 2009/0055270 | A1 * | 2/2009 | Magdon-Ismail .... G06F 16/957 |
| | | | 705/14.27 |
| 2014/0188897 | A1 * | 7/2014 | Baker ............... G06F 16/24578 |
| | | | 707/758 |
| 2015/0019462 | A1 * | 1/2015 | De ......................... G06Q 20/10 |
| | | | 706/50 |
| 2015/0088608 | A1 * | 3/2015 | Cama .................... G06Q 30/00 |
| | | | 705/7.32 |

| | | | |
|---|---|---|---|
| 2016/0162456 | A1 * | 6/2016 | Munro ................. G06F 40/169 |
| | | | 704/9 |
| 2018/0121319 | A1 * | 5/2018 | Ekambaram ........ G06F 11/3672 |
| 2019/0377629 | A1 * | 12/2019 | Williamson ........ G06F 11/3612 |
| 2020/0020015 | A1 * | 1/2020 | Anders ................ G06Q 10/083 |
| 2020/0282561 | A1 * | 9/2020 | Dey ..................... G05B 13/028 |
| 2021/0357591 | A1 * | 11/2021 | Campos Ortega .... G06F 40/103 |
| 2022/0398635 | A1 * | 12/2022 | Jungmeisteris ........ G06Q 50/01 |
| 2024/0281419 | A1 * | 8/2024 | Alfaras ................ G06F 16/215 |
| 2024/0333578 | A1 * | 10/2024 | Mehta ................ H04L 41/0631 |

OTHER PUBLICATIONS

Mahadevan, Gopalakrishnan. "AI and machine learning in retail tech: Enhancing customer insights." International Journal of Computer Science and Mobile Computing 10 (2021): 71-84 (Year: 2021).*

* cited by examiner

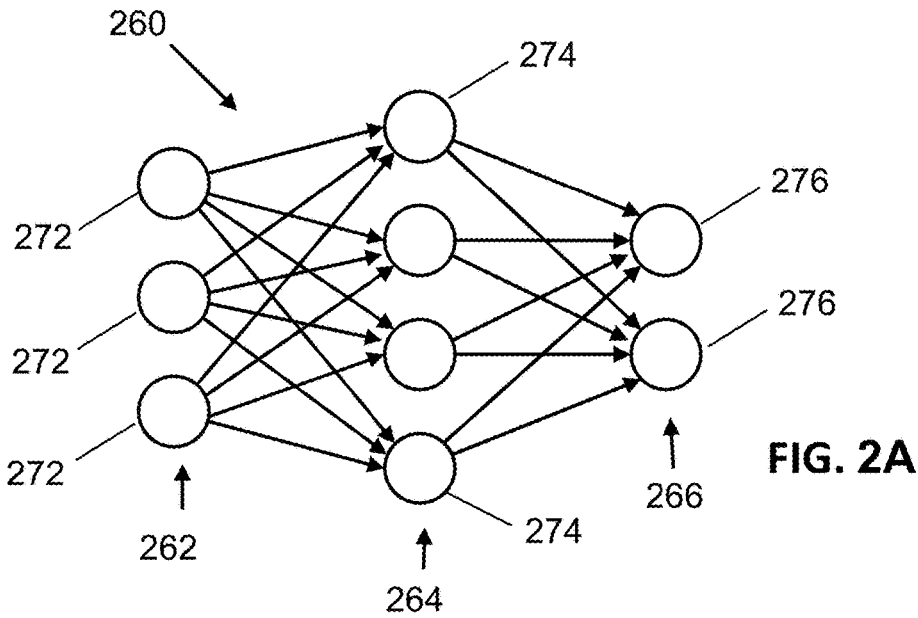
FIG. 2A
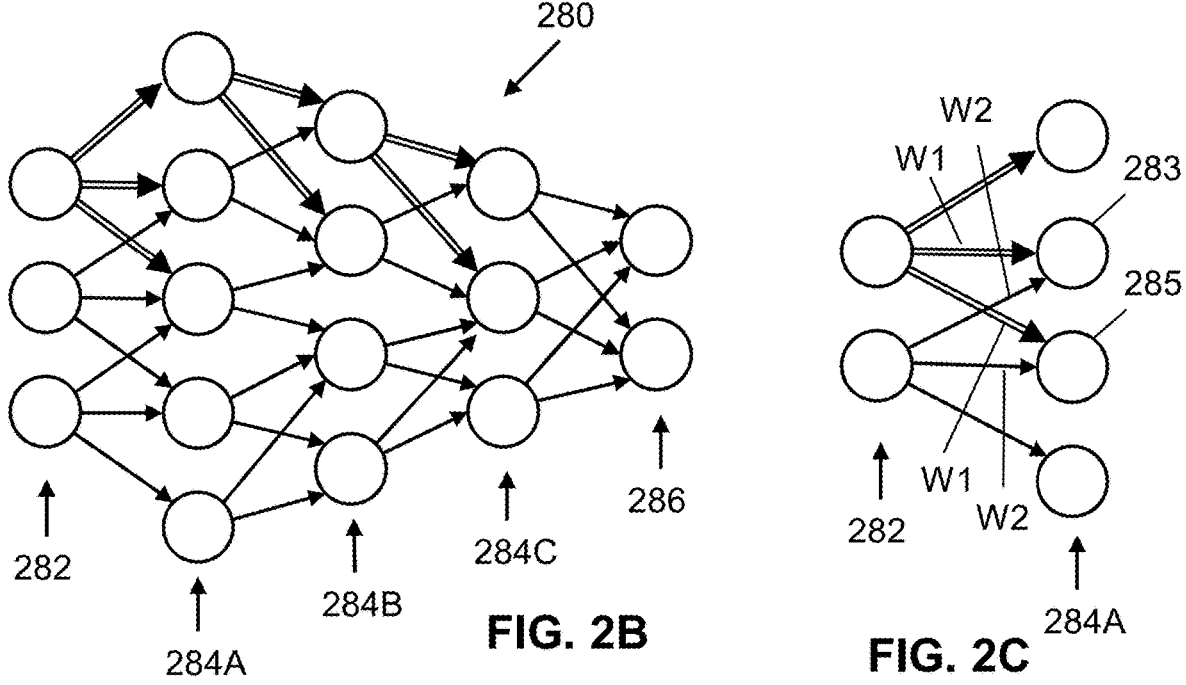
FIG. 2B
FIG. 2C

600

602

604

606

608 ALERT

FEEDBACK LOOP

DATA RECV COLLECT ACCESS

PREPROCESS DATA, CLEAN, TRANSFORM, VALIDATE

612 MODEL TRAINING/BUILDING

TEST DATA

610

TRAIN / TEST LOOP

614 TEST MODEL

616 DEPLOY MODEL

IDENTIFYING ACTIONABLE INSIGHTS IN UNSTRUCTURED DATATYPES OF A SEMANTIC KNOWLEDGE DATABASE

CROSS-REFERENCE TO RELATED APPLICATIONS

This application claims the benefit of the priority date of U.S. Provisional Patent Application Ser. No. 63/594,688, titled TRAINING A MACHINE LEARNING SYSTEM TO IDENTIFY ACTIONABLE SIGNALS IN STRUCTURED AND UNSTRUCTURED DATA CHANNELS, filed Oct. 31, 2023.

FIELD

The present disclosure relates generally to the field of machine learning systems including natural language processing and clustering systems, and more particularly to an artificial intelligence (AI) system for use by a business to process multiple channels of structured and unstructured user experiential feedback, identify commonalities and trends in the feedback data, and deliver specific actionable insights which address the commonalities and trends, where the system is trained with labeled input data to properly recognize data clusters.

BACKGROUND

Many different people interact with a typical business on a regular basis, including people who buy from the business, people who sell to the business, and people who interact with the business in other ways. Likewise, the interactions between the people and the business may take many different forms-including face-to-face interactions in both one-on-one and group settings, telephone interactions with a human representative of the business, telephone interactions with an automated voice response unit, computer-based interactions via email and/or the Internet, and others.

After some of these interactions, people may wish to provide feedback to the business which describes their experience. This is particularly true when a person's experience has been negative or frustrating. Many different forms and channels of communication may be used by people to provide this type of feedback. These include structured channels such as those specifically designed by the business to solicit feedback from people who interact with the business by way of buying, selling or some other type of interaction. The feedback channels also include unstructured and unsolicited feedback, which may come in many forms-including phone calls to a service representative, emails to a service department, posts on the business's social media accounts, and others.

Many different techniques have been employed to analyze the feedback from user interaction experiences, and to gain useful insights from it. However, these existing techniques all suffer from various limitations. For example, the structured feedback obtained via solicitation (e.g., surveys and/or questionnaires) is designed to detect certain types of preconceived problems and complaints, and may miss new or emerging trends in user interaction experiences. The unstructured feedback obtained from myriad sources suffers from the fact that different people use different terminology and phraseology to describe the same thing, and finding correlations between similar complaints is therefore very difficult. Some businesses resort to simply having people randomly review phone call transcripts and other forms of user experience feedback in hopes of detecting trends. And nearly all businesses face organizational obstacles to the effective processing of, and learning from, feedback data which comes from many different sources via many different channels.

In view of the circumstances described above, there is a need for an improved technique of analyzing user experience feedback data across multiple channels to detect commonalities in underlying causes and define actionable insights to address the causes.

BRIEF SUMMARY

The present disclosure describes an artificial intelligence (AI) system for use by a business to process multiple channels of structured and unstructured user experiential feedback data. User experience feedback data is provided from multiple sources via multiple channels—including structured feedback solicited by the business in the form of surveys and questionnaires, and unstructured and unsolicited feedback provided by people who interact with the business and wish to provide feedback in an ad hoc manner. The unstructured feedback may be from social media posts, calls to a service center, emails, and other sources and channels. All of the feedback source data is converted if necessary to text data and aggregated in a data pool. A natural language processing machine learning system is used to analyze the feedback in the data pool and extract the meaning of the feedback in human-understandable terms. Clustering techniques may be used to identify commonalities in the feedback data even when issues are identified in different data channels and are described using different terminology. The commonalities are further analyzed to identify actionable insights which address the underlying issues and ultimately improve the quality of users' experiences. Labeled sample data from the various feedback channels may be used to perform supervised learning of the AI system, after which the system is used in inference mode to process feedback data on an ongoing basis.

The features, functions, and advantages that have been discussed may be achieved independently in various embodiments of the present disclosure or may be combined in yet other embodiments, further details of which can be seen with reference to the following description and drawings, along with the appended claims.

BRIEF DESCRIPTION OF THE DRAWINGS

Figure 1:
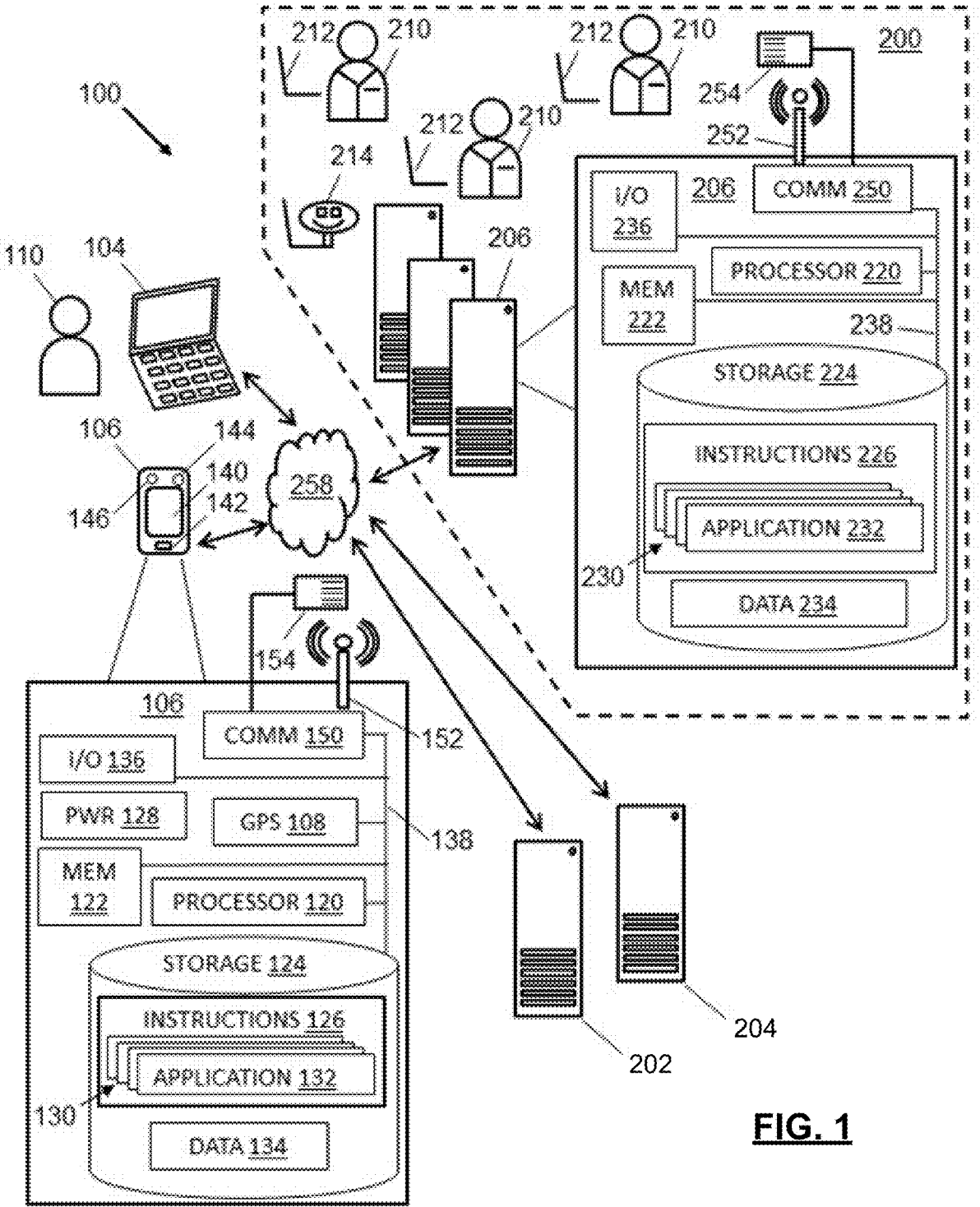
Figure 3:
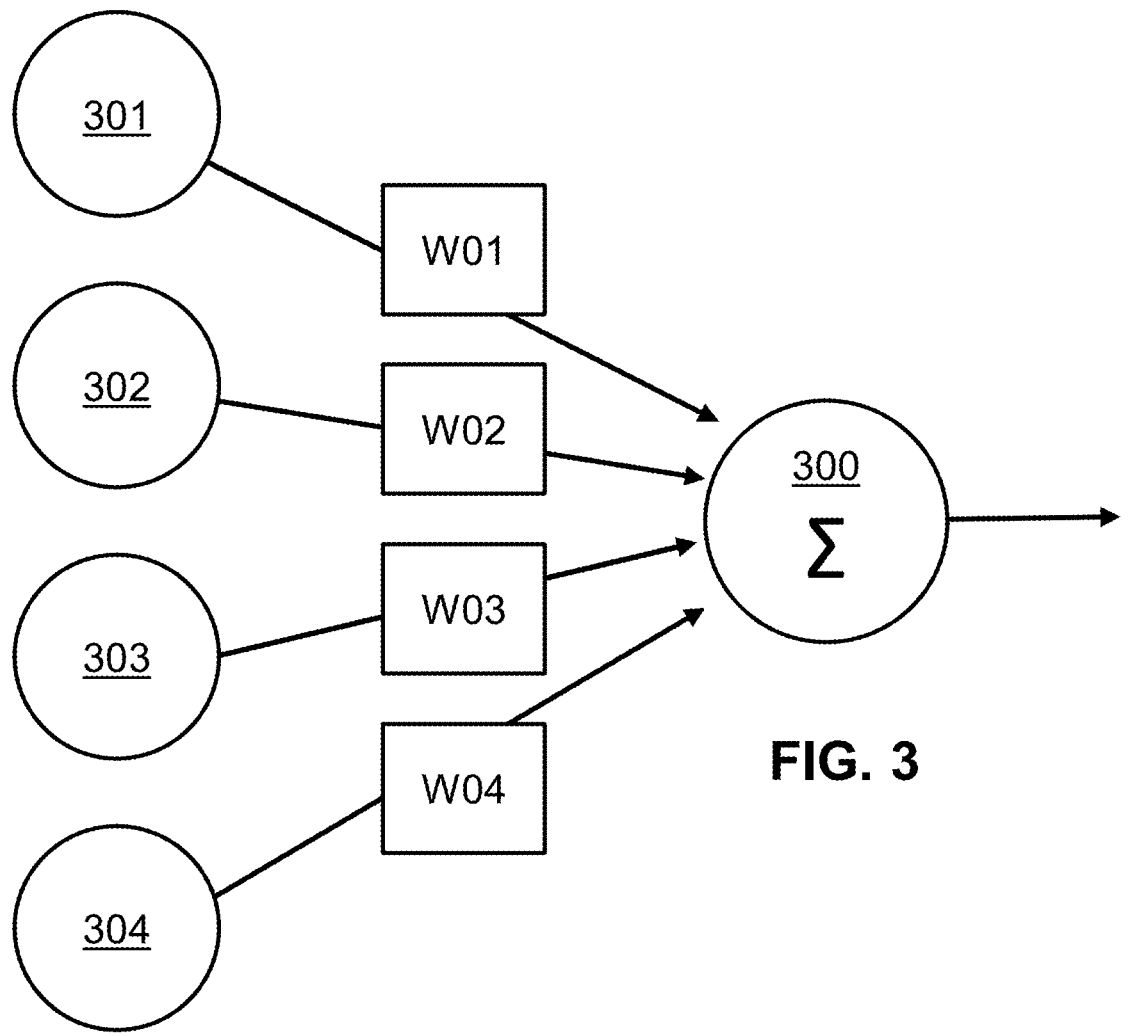
Figure 4:
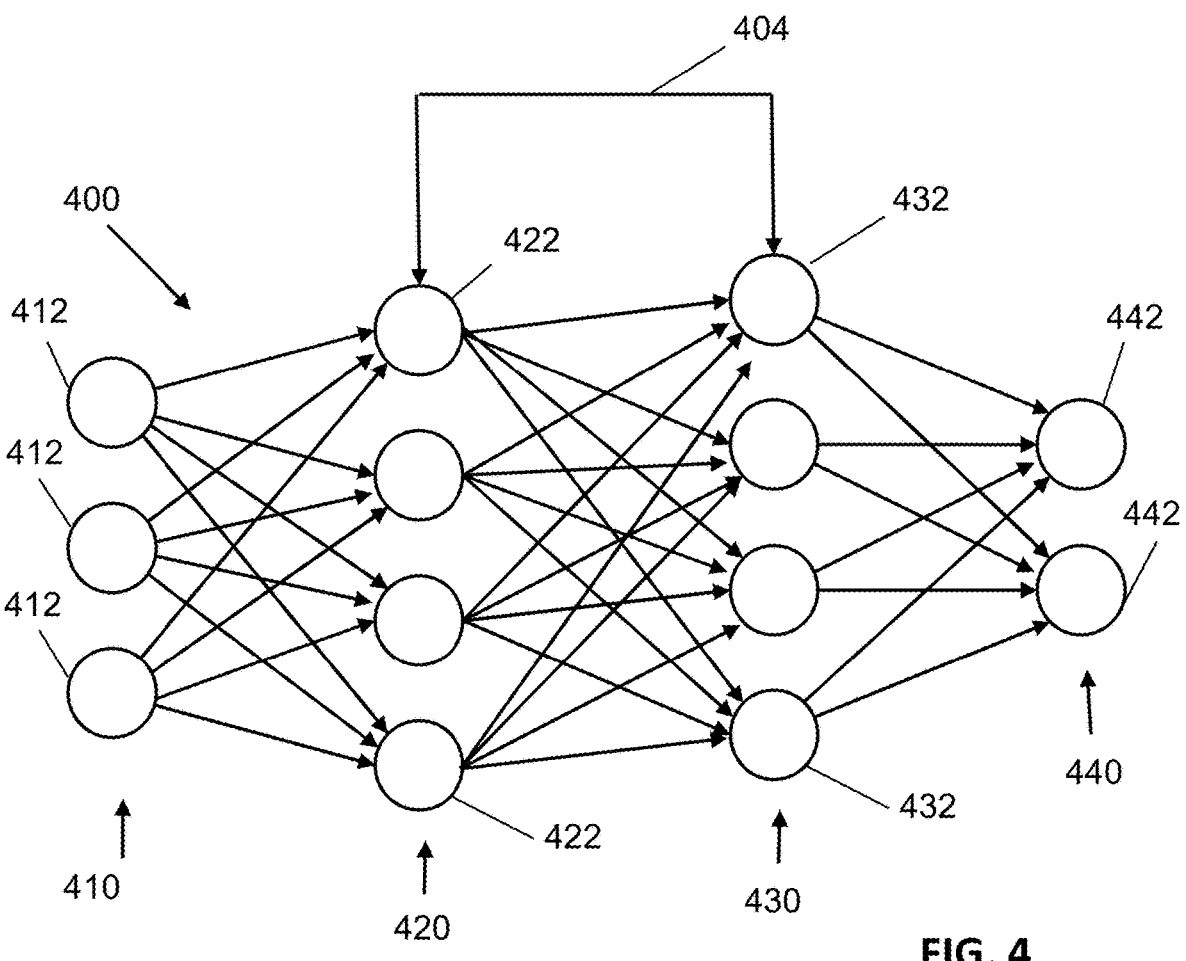
Figure 5:
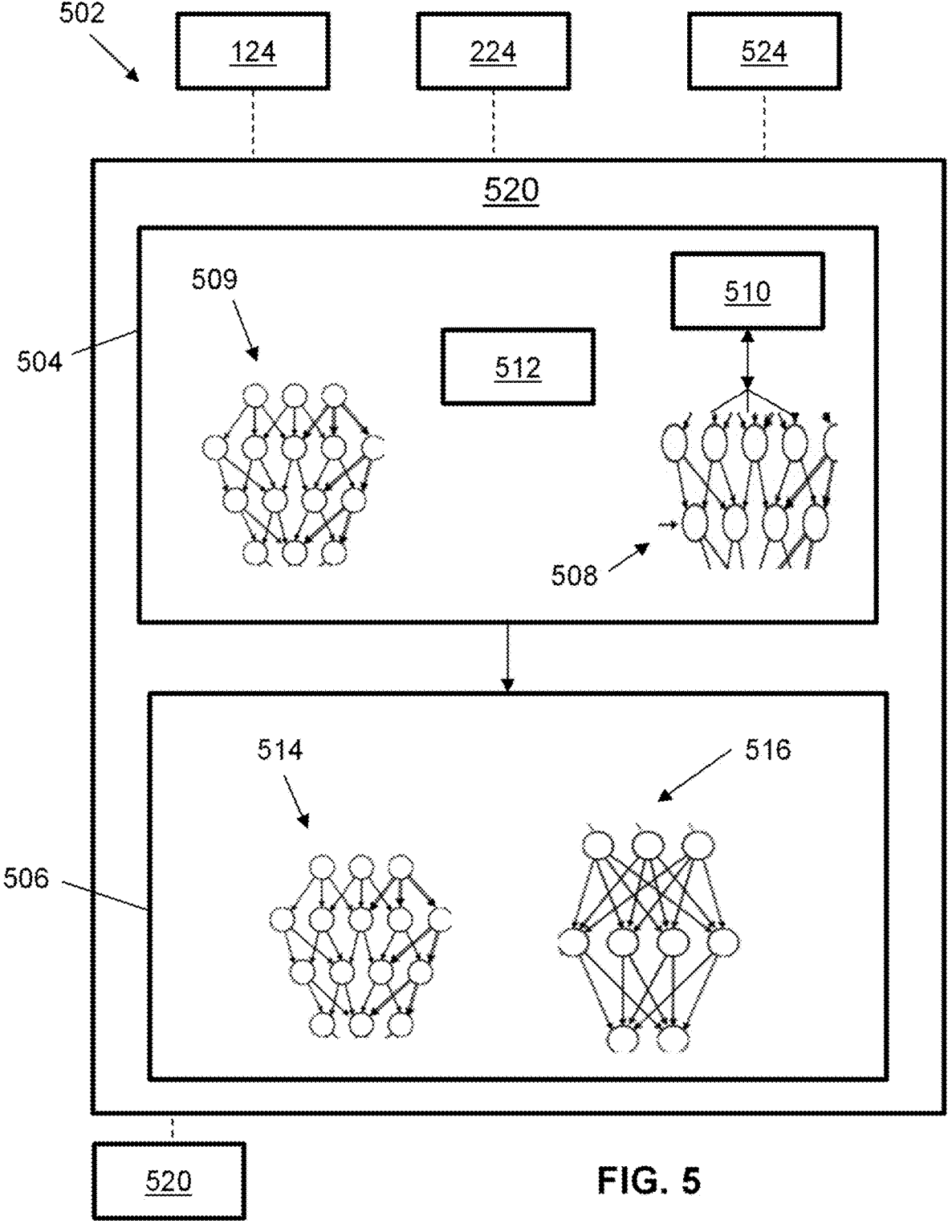
Figure 6:
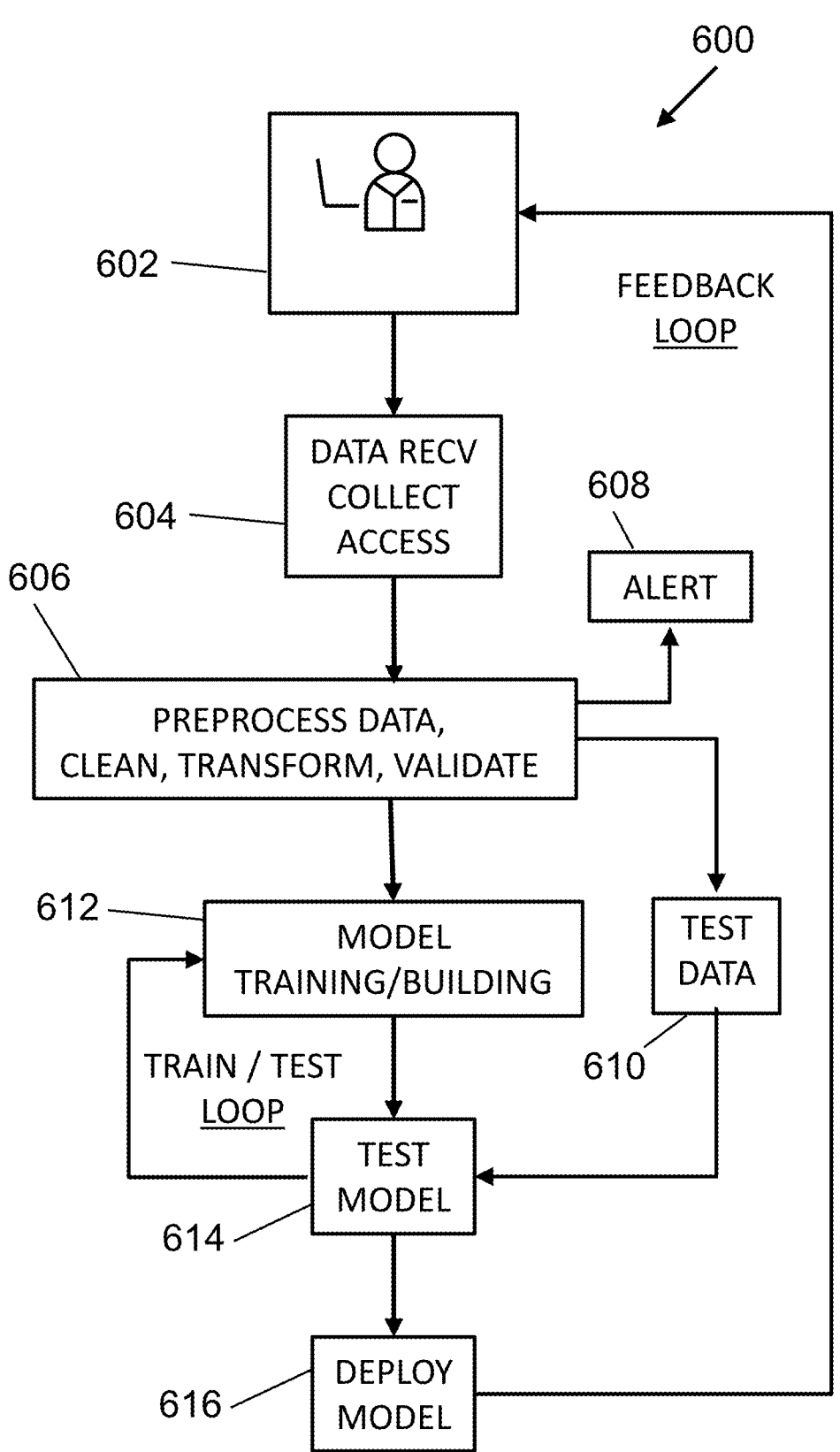
Figure 7:
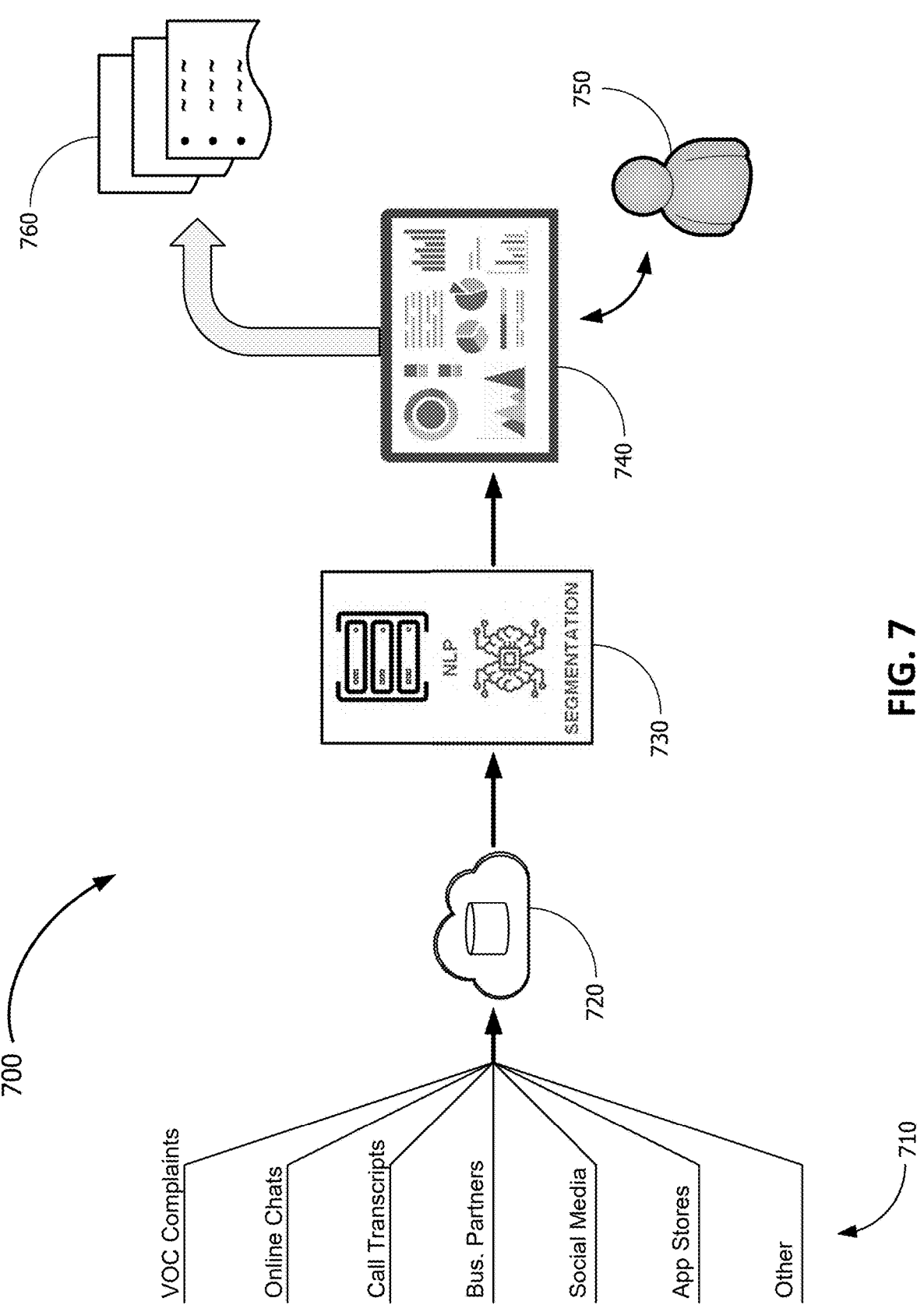
Figure 8:
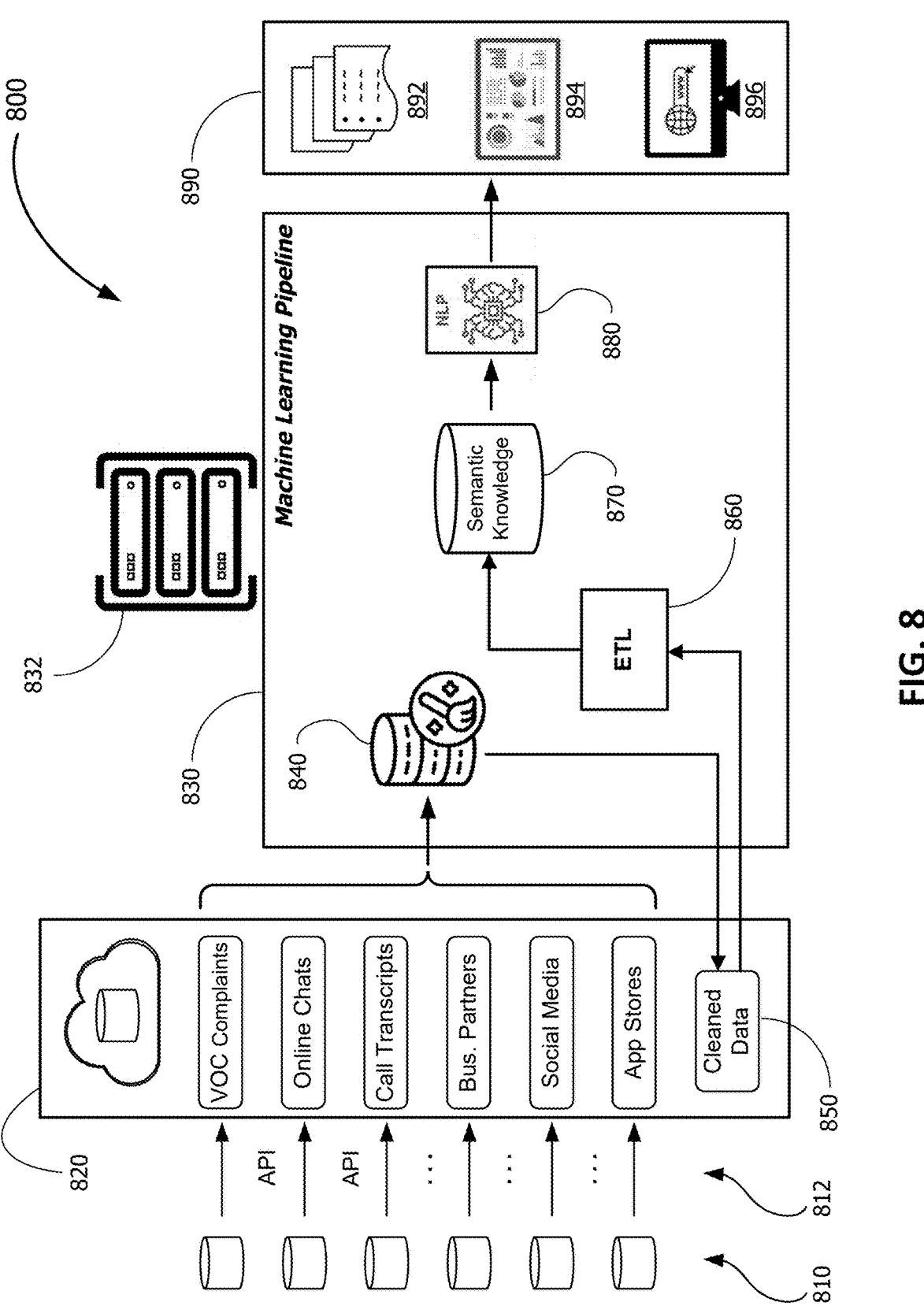
Figure 9:
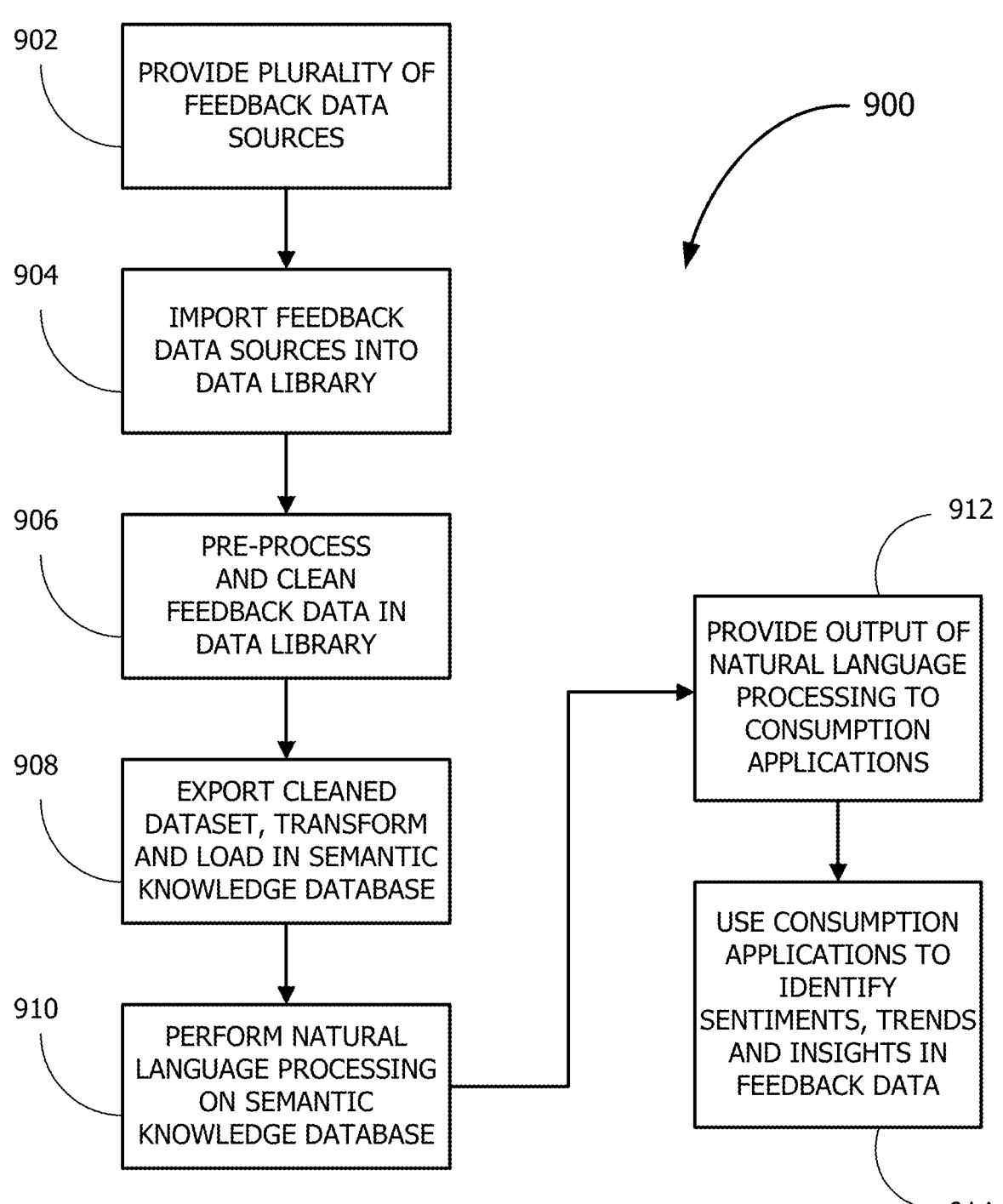
Figure 10:
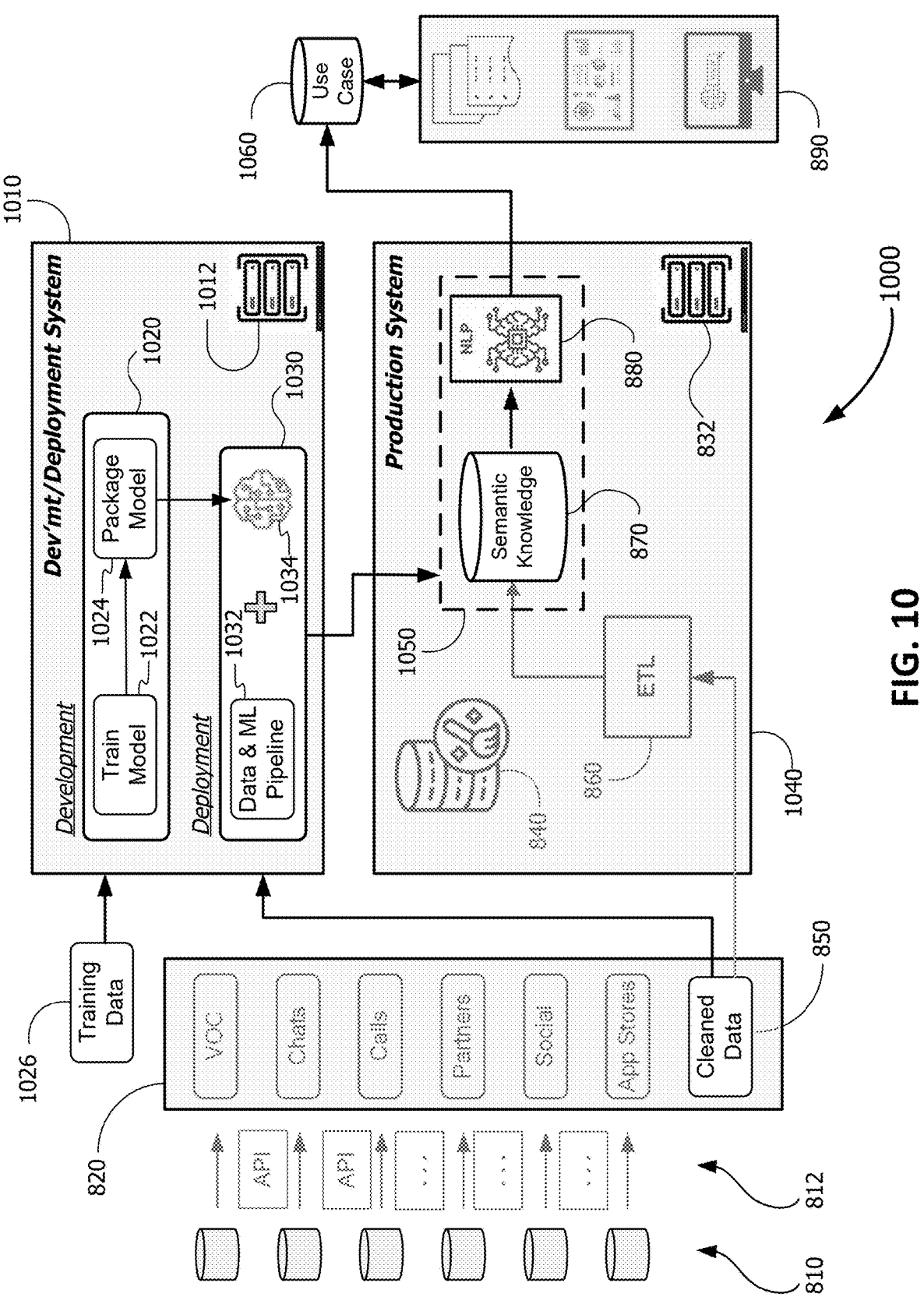
Figure 11:
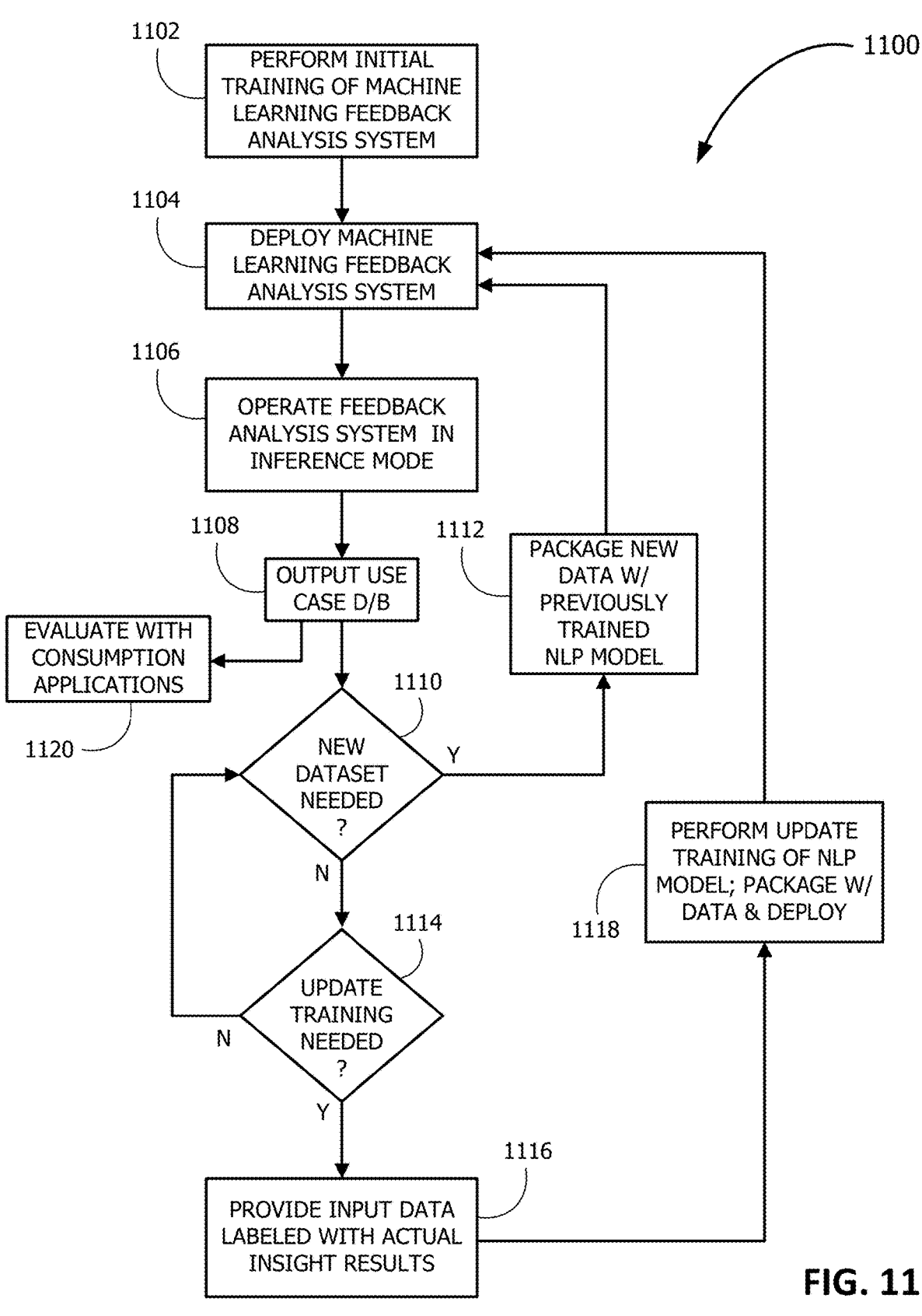

Having thus described embodiments of the invention in general terms, reference will now be made to the accompanying drawings, wherein:

FIG. 1 illustrates an enterprise system, and environment thereof, including a centralized server system, distributed computers and mobile devices, and communication therebetween, according to embodiments of the present disclosure;

FIG. 2A is a diagram of a feedforward network utilized in machine learning, according to embodiments of the present disclosure;

FIG. 2B is a diagram of a convolution neural network utilized in machine learning, according to embodiments of the present disclosure;

FIG. 2C is a diagram of a portion of the convolution neural network of FIG. 2B, illustrating assigned weights at connections or neurons, according to embodiments of the present disclosure;

FIG. 3 is a diagram representing an exemplary weighted sum computation in a node in an artificial neural network, according to embodiments of the present disclosure;

FIG. 4 is a diagram of a Recurrent Neural Network RNN utilized in machine learning, according to embodiments of the present disclosure;

FIG. 5 is a schematic logic diagram of an artificial intelligence program including a front-end and a back-end algorithm, according to embodiments of the present disclosure;

FIG. 6 is a flow chart representing a method of model development and deployment by machine learning, according to embodiments of the present disclosure;

FIG. 7 is a schematic block diagram illustration of a system designed for processing and analysis of business feedback data, according to embodiments of the present disclosure;

FIG. 8 is an architecture diagram of a system designed for processing and analysis of business feedback data using natural language processing and segmentation, according to embodiments of the present disclosure;

FIG. 9 is a flow chart diagram representing a method for processing and analysis of business feedback data using natural language processing and segmentation, according to embodiments of the present disclosure;

FIG. 10 is an architecture diagram of a system for training and deploying a machine learning algorithm for processing and analysis of business feedback data, along with operating the machine learning algorithm in a production mode, according to embodiments of the present disclosure; and FIG. 11 is a flow chart diagram representing a method for training and deploying a machine learning algorithm for processing and analysis of business feedback data, according to embodiments of the present disclosure.

DETAILED DESCRIPTION OF THE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set or database) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled (thicker) arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Having described the general architecture, features and functions of AI systems, including various types of neural networks and other machine learning algorithms, attention will now be turned to specific applications addressed by the present disclosure. The following discussion relates to processing of user experience feedback, by a business, to glean actionable insights from the feedback. In a typical scenario, the "users" are customers of the business, and multiple sources and channels of customer feedback are available to the business. According to the techniques of the present disclosure, an artificial intelligence (AI) system is used to process the multiple channels of structured and unstructured customer feedback, identify commonalities and trends in the feedback data, and deliver specific actionable insights which address the commonalities and trends. Methods of training the system, with labeled input data, to properly recognize data clusters representing the insights, are also disclosed.

A typical modern business has several different means of receiving feedback from other parties who interact with the business—including customers, suppliers and others. This is particularly true in light of the many types of digital communications available. A key concern for the business is how they are perceived by their customers—because the customers can spend their money elsewhere if they feel they are not receiving quality and value in the products and services they receive. Processing and responding to customer feedback is therefore a high priority for many businesses, and is the topic of the present disclosure.

Throughout the following discussion, the terms "customer" (or "client") and "business" are used to describe the two parties in the context of a typical relationship, where the customer receives goods and/or services from the business in exchange for some type of compensation or other benefit received by the business. However, it is to be understood that the example of a customer and a business is non-limiting, and that the techniques of the present disclosure are applicable to other types of user interactions with an institution—including citizens contacting a government office, people (who are not yet customers) contacting a business about a potential future purchase or transaction, and so forth. In short, the disclosed techniques may be applicable to many different types of user feedback directed to an institution or organization.

Take as an example a large business which provides consumer products and/or services. It is likely that the business has a longstanding practice of soliciting "voice of the customer" (VOC) feedback by way of surveys or questionnaires. The VOC feedback is typically solicited from certain customers or groups of customers, and often consists of responses to specific questions, where the responses may include numerical indicators of satisfaction level for various functions of the business. Some of the responses invariably include complaints which the business is inclined to address in order to improve customer satisfaction. Years ago, this type of VOC feedback may have been the only type of formalized customer feedback available to the business. However, in recent years, many other types of customer feedback have become available.

Newer forms of customer feedback include postings on social media sites (particularly the business's own social media accounts), comments and ratings on mobile device "app stores" (online stores where "apps" (applications) are available for download to a user's mobile device), online chat transcripts where customers textually chat with a computerized chat engine and/or a live agent, transcripts of phone calls where customers have called and talked to a customer service representative, and others. These newer forms of customer feedback are mostly unsolicited (i.e., they are initiated by the customer, not in response to a request from the business), and unstructured in nature (i.e., free form text).

All of the forms of VOC feedback described above may contain valuable data in the form of customer insights about how to improve the business. However, aggregating all of the forms of VOC feedback and transforming them into actionable information is very challenging—not only because the customer feedback records come in via many different channels, but also because they take many different forms—most of which are unstructured text transcripts, and many of which may include virtually unintelligible tirades from angry customers, but may still contain a key insight about a customer pain point.

The business's organization structure may present another obstacle to effectively responding to VOC feedback, especially complaints. For example, the sales department may traditionally have the responsibility for soliciting and processing VOC surveys and questionnaires. Meanwhile, the marketing department may have a social media group which is responsible for monitoring the business's social media accounts and flagging complaints which may be worth investigating. Even if these different departments and groups make a concerted effort to share their information, the vastly different forms and formats of the VOC feedback make such sharing efforts minimally effective.

In response to the situation discussed above, the need was recognized for a technological solution—a system to aggregate and democratize relevant VOC information at the enterprise level. The solution described below is highly-customizable, using artificial intelligence (AI) to holistically aggregate and analyze the customer feedback landscape to distill and deliver specific, actionable insights across lines of business and corporate functions. Machine learning (ML) and natural language processing (NLP) are used to analyze structured and unstructured data across channels and sources to detect trends which correspond to actionable insights for the business. These insights can then be used to detect (signal), remediate and pre-empt client pain points and complaint drivers to boost client retention, deepen client relationships and optimize business operations.

FIG. 7 is a schematic block diagram illustration of a system 700 designed for processing and analysis of business feedback data, according to embodiments of the present disclosure. A plurality of customer (a.k.a., client) feedback sources 710 are available to the business, as discussed above. These feedback sources 710 include VOC complaints, which are part of the solicited and structured voice of the customer surveys and questionnaires described earlier. For the purposes of the present discussion, customer dissatisfaction is the area of interest. Thus, although the VOC surveys may include lots of positive customer feedback, the VOC complaints are understood to include only negative feedback.

The feedback sources 710 also include transcripts from online chat sessions, transcripts from phone calls to customer service/support lines, comments and postings on social media sites—particularly the business's own social media accounts, and commends and ratings for the business's mobile apps which are available in app stores. These sources and channels of customer feedback information were all discussed earlier. In addition, customer feedback may be provided indirectly by way of a business partner—such as a supplier of products or data to the business. These business partners may be understood as third-party businesses who share a product offering and/or a customer base with the primary business, where the shared customers may provide feedback about the primary business by way of the third-party business. Still other sources of customer feedback data may be provided to the business and are considered within the scope of the present disclosure.

It will be understood by those skilled in the art that much of the data in the feedback sources 710 is in the form of electronic data, specifically text data. The data in the feedback sources 710 may also include audio data (recordings of phone calls) which can readily be converted to text data via voice-to-text converters or translators. Other types of data such as numerical ratings, corresponding to specific topics or business functions, may also be included.

The data from all of the channels of the feedback sources 710 is collected in a data library 720. Many other terms—such as data lake, data pool, data cloud, and database(s)—may be used interchangeably with data library. The data library 720 is a data store used as input for further processing, and also serves as a repository for the customer feedback data in its original form before processing.

A machine learning system 730 processes the data from the data library 720 to produce the insights and analyses which are actionable by the business. The machine learning system 730 uses natural language processing and other technologies to decipher the meaning of customer comments. Data clustering/segmentation and other technologies are also used to identify groupings and trends in the data, where topics which appear in many customer responses across multiple feedback channels are particularly noteworthy to the business.

The machine learning system 730 provides outputs including a dashboard 740—which is an interactive system accessible by a user 750 to view data graphs and summaries, drill down into the underlying data in areas of interest, and so forth. Reports and metrics 760 may also be produced, by way of the dashboard 740 (at the request of the user 750), and/or automatically by the machine learning system 730 on a periodic basis or as triggered by certain data characteristics. While FIG. 7 provides a high level overview, all of the elements of the system 700 are discussed further below.

FIG. 8 is an architecture diagram of a system 800 designed for processing and analysis of business feedback data using natural language processing and segmentation, according to embodiments of the present disclosure. A plurality of data sources 810 are provided as input. The data sources 810 represent the feedback sources 710 of FIG. 7. Many of the data sources 810 are sources which are external to the business, such as data from social media sites, app stores, transcripts from third-party call-answering services, etc. As such, a plurality of application programming interfaces (APIs) 812 are needed in order to import the data sources 810 into a data library 820. It is not necessarily true that every one of the data sources 810 will need an API in order to import the data, but most of them will, so the APIs 812 are depicted generally as being used for each of the data sources 810.

The data from the data library 820 is provided to a machine learning pipeline 830, which is a group of computing modules which collectively process the VOC feedback data and extract trends and insights. The modules of the machine learning pipeline 830 run on one or more computing devices having a processor and memory, represented in FIG. 8 by a server computer 832. The server computer 832 corresponds with the computing system 206 discussed earlier with respect to the enterprise computing environment of FIG. 1. As would be understood by those skilled in the art, the server computer 832 may comprise general purpose processors and/or special purpose devices configured for neural networks, natural language processing or other machine learning purposes.

The data from the data library 820 is provided to a pre-processing module 840 which performs several data pre-processing and cleaning functions. These functions include removing personally identifiable information, simplifying language, consolidating terms, removing stop words and applying other techniques to generally remove noise from the feedback data. The output of the pre-processing module 830 is stored in a cleaned dataset 850 in the data library 820.

At certain intervals, the cleaned dataset 850 is provided to an export, transform and load (ETL) module 860. The ETL module 860 transforms the cleaned dataset 850 and loads it into a semantic knowledge database 870. In the semantic knowledge database 870, the voice of the customer feedback data is in a consistent and standardized format, where it can be provided as input to a natural language processing (NLP) service 880. The NLP service 880 performs feature extraction and sentiment analysis, and predicts the sentiment of the given text. Sentiment is one indicator of customer dissatisfaction which may be used in gaining insights from the VOC feedback data.

Feature extraction is a machine learning technology which takes an input (such as a large amount of text) and provides as output a set of feature vectors which characterize the input. The feature extractor dramatically reduces the amount of data required for subsequent processing—by replacing text data containing a large number of characters and words with feature vectors which may be orders of magnitude smaller in number. The feature extractor may be programmed in a multi-level convolutional neural network (CNN), for example.

The NLP service 880 may include modules and algorithms which perform other machine learning techniques—such as segmentation and clustering to identify commonalities and trends in the feature data. For example, certain clusters of feature data may correspond with a high level of customer dissatisfaction with a particular product offering from the business, or with a mobile app offered by the business.

The trends, predictions, data clusters, commonalities and any other insights from the NLP service 880 are provided as outputs to a set of consumption applications 890. The consumption applications 890 include pre-defined or ad hoc reports 892, an insights dashboard 894 and a web application 896. The consumption applications 890 are accessed by individuals and groups within the business, such as the user 750 of FIG. 7, to understand the insights which have been revealed by processing of the VOC feedback data. As provided in the consumption applications 890, the insights include issues which have been most commonly identified by customers across all input channels, products and services which are associated with the greatest degree of dissatisfaction among customers, trend and insight data within individual product lines, and so forth. All of this is available without the users of the consumption applications 890 having to laboriously read the vast number of customer comments (often poorly worded), while still providing traceability of specific trends and insights back to the original underlying customer comments which may be reviewed as desired.

Most of the data sources 810 originate in the form of digital text data, which is what is needed for further processing in the pre-processing module 840 and other components of the machine learning pipeline 830. One exception is the call transcripts, which originate as audio phone call recordings. In certain embodiments, audio signal transduction or transformation is performed on the audio recordings, thereby producing digital text data suitable for further processing. The transformation of the audio recordings into digital text invariably introduces lots of noise—including spurious words such as "uh" and "um", misunderstood words and phrases, missed words, and so forth—but these are exactly the kind of things that the pre-processing module 840 addresses. Thus, all of the various data sources 810 end up as digital text, which is then pre-processed and cleaned, parsed and stored, and ultimately has natural language processing performed thereupon.

In a preferred embodiment, the data sources 810 are imported into the data library 820 and then, on a periodic basis, the data from the data library 820 is processed through the machine learning pipeline 830. In order for the machine learning pipeline 830, and the natural language processing service 880 in particular, to effectively provide actionable insights from the voice of the customer feedback data, training of the machine learning pipeline is necessary.

In preferred embodiments, the machine learning pipeline 830 is trained using real customer feedback dialog text records which have been supplemented with additional data needed to perform supervised learning. Supervised learning is a machine learning training approach that is defined by its use of labeled datasets. These datasets are designed to train or "supervise" algorithms into classifying data or predicting outcomes accurately. Using labeled inputs and outputs, the machine learning algorithm can measure its accuracy and learn over time.

For example, the business can be presumed to have access to most or all of the various data sources 810, even if they are not readily available in the data library 820 as shown in FIG. 8. Human analysts (e.g., people in the sales department of the business, the customer service department, etc.) can review individual VOC feedback records and identify the key attributes. For example, a review of a particular call transcript might reveal a main sentiment as "angry" and the target of the sentiment as "the company in general". Another call transcript might reveal a user who is frustrated with features of the business's mobile app. A social media post may indicate that a customer feels that the business's products and/or services are not competitive with offerings from other companies. A particular customer's VOC survey might reveal general dissatisfaction with one particular product offering of the business.

This type of manual analysis of input data for training purposes, described above, is known as labeling. The database of labeled VOC feedback records is provided as a training database for the initial training of the machine learning pipeline 830 using supervised learning.

After initial training, the machine learning pipeline 830 is deployed and used for processing actual customer feedback text which has not been analyzed and labeled by a human analyst. The usage of the machine learning pipeline 830 for live operations is known as inference mode. This is the "normal production" mode of operation where new customer feedback records are processed in the machine learning pipeline 830 and the actionable insights are provided to the consumption applications 890 for review and action by the business.

Ongoing training may periodically be performed on the machine learning pipeline 830 using recently-processed VOC feedback and the resulting insights and actions which were gleaned therefrom. For example, when the business reviews the data in the consumption applications 890 and identifies a cluster of dissatisfaction related to the business's mobile app, this can be traced back to the original records in the data sources 810 (which may be spread across app store ratings, social media posts, call transcripts and online chat records). Those original records can then be labeled with the identified sentiments and targets, and those records can be used for update training of the machine learning pipeline 830. In this way, the periodic ongoing training can further improve the efficiency and effectiveness of the machine learning pipeline 830 for identification of relevant clusters in the VOC feedback data. An architecture diagram including training and deployment is provided later and discussed below.

FIG. 9 is a flow chart diagram 900 representing a method for processing and analysis of business feedback data using natural language processing and segmentation, according to embodiments of the present disclosure. At box 902, a plurality of VOC feedback sources are provided. These are the data sources 810 of FIG. 8 and the feedback sources 710 of FIG. 7. At box 904, the data sources are imported into the data library 820, using APIs where necessary for the import.

At box 906, the data in the data library is provided to the machine learning pipeline 830 as discussed earlier. This begins by pre-processing and cleaning the data in the data library 820, using the pre-processing module 840, and storing the results in the cleaned dataset 850. The data pre-processing and cleaning functions include removing personally identifiable information, simplifying language, consolidating terms, removing stop words and applying other techniques to generally remove noise from the feedback data.

At box 908, the data from the cleaned dataset 850 is exported, transformed and loaded into the semantic knowledge database 870. In the semantic knowledge database 870, the voice of the customer feedback data is in a consistent and standardized format, where it can be further processed.

At box 910, natural language processing (NLP) is performed on the semantic knowledge database 870. The NLP performs feature extraction and sentiment analysis, and predicts the sentiment of the given text. Data clustering and segmentation are also performed, to identify clusters of customer feedback related to certain products, services and departments of the business.

At box 912, the output of the natural language processing is provided to the consumption applications 890, where at box 914 business users can view and analyze the results, identify trends and insights, and determine actions which can be taken to address the shortcomings identified in the customer feedback. This may include tracing of identified insights back to the original customer feedback data records. The consumption applications 890 include pre-defined or ad hoc reports, an insights dashboard and a web application, providing individuals and groups within the business the ability to understand the insights which have been revealed by processing of the VOC feedback data.

FIG. 10 is an architecture diagram of a system 1000 for training and deploying a machine learning algorithm for processing and analysis of business feedback data, along with operating the machine learning algorithm in a production mode, according to embodiments of the present disclosure. Where FIG. 8 provided a simplified illustration depicting only the incoming data elements and their incorporation into the production machine learning pipeline, FIG. 10 provides more detail of the complete architecture used for training/development and deployment of the system into production. In particular, a development/deployment system 1010 is shown in FIG. 10 which was not discussed previously.

The data sources 810 containing the various forms of customer feedback, and the APIs used to import the data sources into the data library 820, as shown in FIG. 8 and discussed earlier, are shown at the left of FIG. 10. These operate as described in connection with FIG. 8, ultimately resulting in a cleaned dataset 850. The arrows showing the data in the data library 820 passing through the pre-processing module 840 are omitted from FIG. 10 for clarity.

For initial or recurrent training of the machine learning pipeline, a training dataset 1026 is provided to the development/deployment system 1010, specifically to a development module 1020 which includes a model training block 1022 and a model packaging block 1024. The training dataset 1026 is a dataset of customer feedback records labeled with corresponding actionable insights, such as sentiment, product or service addressed, etc. The training dataset 1026 is used for supervised learning training of the natural language processing service 880 in the model training block 1022. As discussed earlier, the supervised learning training causes the neural network(s) in the NLP service 880 to establish the layers, nodes, connectivity and weighting which accurately provide the outputs (the labeled actionable insights) corresponding with the inputs (the customer feedback records) as defined in the training dataset 1026. The trained NLP model is provided to the model packaging block 1024 to prepare the NLP model for deployment.

In a deployment module 1030, a block 1032 combines the cleaned dataset 850 with the complete machine learning pipeline, and into this is incorporated the trained NLP model which is identified as 1034. The complete machine learning pipeline including the customer feedback data and the trained NLP model 1034 are then provided to a production system 1040—specifically as the semantic knowledge database 870 and the NLP service 880 shown in a dashed box 1050. The NLP service 880 performs feature extraction and sentiment analysis, and predicts the sentiment of any given text in the customer feedback data.

In a typical embodiment, users do not directly interact with the NLP service 880. Instead, on a periodic basis, the NLP service 880 processes the customer feedback data represented in the semantic knowledge database 870 and outputs the results to a use case database 1060. The use case database 1060 contains the actionable insights (e.g., sentiments, clusters of the business's products and services having like sentiments, etc.) produced as output from the NLP service 880. The use case database 1060 is accessed by business users via the consumption applications 890 described earlier. For example, when the business reviews the data via the consumption applications 890 and identifies a cluster of dissatisfaction related to the business's mobile app, this can be traced back to the original records in the data sources 810 (which may be spread across app store ratings, social media posts, call transcripts and online chat records).

The production system 1040 includes the elements of the machine learning pipeline 830 of FIG. 8 (which was simplified to exclude development and deployment). In a typical embodiment, the production system 1040 runs on the server computer 832 as shown earlier, and the development/deployment system 1010 runs on a server computer 1012 which is a different device than the server computer 832. Other embodiments are possible, including development/deployment and production all being performed on the same server or computing device, with the appropriate separation of data and software module instances.

How frequently model training is performed (in the development module 1020), and how frequently new customer feedback data is packaged with the trained NLP model (in the deployment module 1030), are details which may be defined as most suitable to any particular business and application. For example, a high volume of customer feedback data from the data sources 810 would tend to drive a relatively frequent packaging and rollout of the data with the trained NLP model, such as weekly, as an example. The NLP model may need update training whenever a new source of customer feedback data comes online, or after a certain amount of time has elapsed since the last model training; this could be every few months, for example.

FIG. 11 is a flow chart diagram 1100 representing a method for training and deploying a machine learning algorithm for processing and analysis of business feedback data, according to embodiments of the present disclosure. Prior to the first step in FIG. 11, an architecture for the machine learning feedback analysis system is chosen, such as using a machine learning algorithm with natural language processing and clustering features, and more particularly, a specific type such as a recurrent neural network (RNN), as discussed earlier.

At box 1102, initial training is performed on the machine learning pipeline, specifically the NLP model used in the feedback analysis system. The initial training was described earlier, including performing a supervised learning of the NLP model using actual customer feedback records labeled with particular sentiments, trends, product segments, and so forth. The initial training also includes packaging the trained NLP model with the customer feedback data to create the complete machine learning system. These steps were depicted in the development module 1020 and the deployment module 1030 of FIG. 10.

At box 1104, the AI feedback analysis system including the machine learning algorithm (the trained NLP model) is deployed for operation processing actual customer feedback records from the plurality of data sources. At box 1106, the AI feedback analysis system including the machine learning algorithm is operated in inference mode; this process was depicted in the flowchart diagram of FIG. 9, and in the box 1050 of FIG. 10. At box 1108, as discussed above, the operation of the NLP service 880 in inference mode provides output to the use case database 1060 shown in FIG. 10.

At decision diamond 1110, it is determined whether a new customer feedback dataset is needed. As discussed above, a new customer feedback dataset might be desired on a regular periodic basis, such as weekly or monthly, depending on the volume of customer feedback data (in the data sources 810). Alternately, the need for a new customer feedback dataset might be triggered by an accumulation of new customer feedback data records which exceeds a defined threshold (e.g., 1000). The criteria for incorporating a new customer feedback dataset may be defined by the business in any manner deemed suitable.

When a new customer feedback dataset is required at the decision diamond 1110, the new dataset is packaged with the previously trained NLP model at box 1112, and process returns to the box 1104 to re-deploy the feedback analysis system including the trained NLP model packaged with the new customer feedback dataset. This step was depicted in the deployment module 1030 of FIG. 10. The feedback analysis system with the most recent customer feedback data is then used to produce a new use case database, as discussed above.

When a new customer feedback dataset is not required at the decision diamond 1110, it is determined at decision diamond 1114 whether update training is needed for the NLP model 1034 in the AI feedback analysis system. This determination may be made based on any suitable factors-such as a length of elapsed time since system deployment or most recent update training, the availability of a new source of customer feedback data, or the availability of an upcoming system maintenance window where an updated version of the AI system may conveniently be placed into operation. Other factors may also lead to a determination that update training of the machine learning algorithm is needed or desired; this determination can be made in any suitable manner by the business. If update training is not called for at the decision diamond 1114, the process returns to the decision diamond 1110 where the determinations of whether a new dataset is needed and/or whether update training is needed are made on a periodic basis—such as daily.

When update training is called for at the decision diamond 1114, the process moves to box 1118. At the box 1118, a new training dataset 1026 is provided in the manner discussed earlier—where the training dataset 1026 includes input data records labeled with validated insights and product/service info. With the updated training dataset, update training of the machine learning feedback analysis system (specifically the NLP model 1034) is performed. This is a supervised learning process, as the training data is labeled with desired results. The new NLP model after update is packaged with the latest customer feedback dataset and deployed at the box 1104, leading to the output of a new use case database. The training of the NLP model 1034, packaging with the customer feedback data and deployment to production were depicted in the development module 1020 and the deployment module 1030 of FIG. 10.

Throughout the process depicted in the flowchart diagram 1100, the use case database which was output at the box 1108 by the latest deployment of the machine learning customer feedback analysis system (whether an initial deployment, or a deployment with a new data package, or a deployment with a new NLP model after update training) is evaluated at box 1120 using the consumption applications 890. This includes employees of the business using the consumption applications 890 to evaluate the use case database 1060 to gain insights into a particular product or service of the business, look for clusters of particularly positive or negative feedback, etc. This capability provides insight into the sentiment of the business's clients which is more focused and easier to understand than with any existing system or method. This is particularly true because there are many customer feedback data sources, and the feedback comes in both structured and unstructured forms.

The machine learning algorithm with natural language processing and the corresponding training techniques, defined in FIGS. 7-11 and described above, may be implemented in a system of the type shown in FIG. 1 as follows. The client or customer (the person who is providing feedback to the business) is represented by the user 110 in FIG. 1. The user 110 may be using the computing device 104 (e.g., a laptop or desktop computer, a tablet device, etc.) or the user 110 may be using the mobile device 106, in either a textual interaction (using a display and a real or virtual keyboard) or an audio phone call interaction. The user 110 may also use any other type of telephone (land line, voice-over-IP, etc.) in an audio phone call interaction.

The business (the entity or organization which is talking or text-chatting with the client) is represented by the enterprise system 200 in FIG. 1. This includes the computing system 206 which is configured, for example, with a machine learning pipeline programmed as an application 232 and executing on the processor 220. The memory 222 and the data 234 are accessed by the machine learning algorithm running on the processor 220 in a manner known to those skilled in the art. Separate instances of the computing system 206 (i.e., different servers) may be used for the development/deployment system 1010 and the production system 1040, respectively.

The AI feedback analysis system including the machine learning algorithm, discussed above, provides features for natural language processing and segmentation which are applicable to customer feedback records from a variety of sources. These features enable the AI feedback analysis system to effectively navigate through diverse and uncertain text records to identify patterns in the underlying sentiment. This enables the business to implement actions which address shortcomings, ultimately leading to increased customer satisfaction which in turn benefits the business operating the system.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for analyzing customer feedback data received via multiple input channels, said system comprising:

a computer with one or more processors and memory, where the computer is configured to process and analyze customer feedback data received from a plurality of external data sources via the multiple input channels; and a network connection operatively connecting the external data sources to the computer, where the computer is configured to perform steps including:

importing the customer feedback data from the external data sources into a data library, where the multiple input channels include voice of the customer complaints, online chat transcripts, phone call transcripts, social media posts, ratings and comments from mobile application stores and customer feedback provided via a third-party business;

pre-processing the customer feedback data in the data library to provide a cleaned dataset, where the pre-processing includes removing personally identifiable information, simplifying language, consolidating terms, removing stop words and removing noise from the customer feedback data;

loading the cleaned dataset into a semantic knowledge database, including transforming the cleaned dataset into a standardized data structure;

analyzing the semantic knowledge database, using a machine learning algorithm including a natural language processing (NLP) application and a segmentation application, to produce output data including a use case database; and providing the use case database to a set of consumption applications, where the set of consumption applications are utilized by users to identify actionable insights, where the actionable insights include customer sentiments, and clusters of products, services and business segments appearing in the customer feedback data and associated with the customer sentiments;

wherein the NLP application is trained via supervised learning using a training dataset of customer feedback records labeled with corresponding actionable insights, wherein the supervised learning causes neural networks in the NLP application to establish layers, nodes, connectivity, and weighting, which minimize error signals between the labeled customer feedback records and the corresponding actionable insights in the training dataset;

wherein the semantic knowledge database is updated by loading a new version of the cleaned dataset, and the updated semantic knowledge database is analyzed by the machine learning algorithm including the NLP application to produce new output data, when an elapsed time from a previous update of the semantic knowledge database exceeds a threshold or a data update triggering event occurs; and wherein the NLP application receives updated training using a new training dataset resulting in an updated NLP application, and the updated NLP application in the machine learning algorithm is used to analyze a latest version of the semantic knowledge database to produce new output data, the updated training of the NLP application occurring when an elapsed time from a previous training of the NLP application exceeds a threshold or an NLP update triggering event occurs.

2. The system according to claim 1 wherein, after identifying actionable insights, the set of consumption applications are utilized by the users to trace the customer sentiments and the clusters of products, services and business segments back to original records in the customer feedback data received from the plurality of external data sources via the multiple input channels.

3. A method for analyzing customer feedback data received via multiple input channels, said method comprising:

importing the customer feedback data from a plurality of external data sources into a data library, where the multiple input channels include voice of the customer complaints, online chat transcripts, phone call transcripts, social media posts, ratings and comments from mobile application stores and customer feedback provided via a third-party business;

pre-processing the customer feedback data in the data library, using a computer having a processor and memory, to provide a cleaned dataset, where the pre-processing includes removing personally identifiable information, simplifying language, consolidating terms, removing stop words and removing noise from the customer feedback data;

loading the cleaned dataset into a semantic knowledge database, including transforming the cleaned dataset into a standardized data structure;

analyzing the semantic knowledge database, using a machine learning algorithm running on the computer, said machine learning algorithm including a natural language processing (NLP) application and a segmentation application, to produce output data; and providing the output data to a set of consumption applications, where the set of consumption applications are utilized by users to identify actionable insights, where the actionable insights include customer sentiments, and clusters of products, services and business segments appearing in the customer feedback data; and wherein the NLP application receives updated training using a new training dataset resulting in an updated NLP application, and the updated NLP application in the machine learning algorithm is used to analyze a latest version of the semantic knowledge database to produce new output data, the updated training of the NLP application occurring when an elapsed time from a previous updated training of the NLP application exceeds a threshold or an NLP update triggering event occurs.

4. The method according to claim 3 wherein the multiple input channels include voice of the customer complaints, online chat transcripts, phone call transcripts, social media posts, ratings and comments from mobile application stores and customer feedback provided via third-party businesses.

5. The method according to claim 4 wherein, after identifying actionable insights, the set of consumption applications are utilized by the users to trace the customer sentiments and the clusters of products, services and business segments back to original records in the customer feedback data received from the plurality of external data sources via the multiple input channels.

6. The method according to claim 4 wherein the phone call transcripts are derived from audio data collected during customer phone calls, where a speech signal processing system performs audio transduction on the audio data to generate the phone call transcripts in the form of digital text data.

7. The method according to claim 3 wherein the semantic knowledge database is updated by loading a new version of the cleaned dataset, and the updated semantic knowledge database is analyzed by the machine learning algorithm including the NLP application to produce new output data, when an elapsed time from a previous update of the semantic knowledge database exceeds a threshold or a data update triggering event occurs.

8. A method for analyzing customer feedback data received via multiple input channels, said method comprising:

importing the customer feedback data from a plurality of external data sources into a data library, where the multiple input channels include voice of the customer complaints, online chat transcripts, phone call transcripts, social media posts, ratings and comments from mobile application stores and customer feedback provided via a third-party business;

pre-processing the customer feedback data in the data library, using a computer having a processor and memory, to provide a cleaned dataset, where the pre-processing includes removing personally identifiable information, simplifying language, consolidating terms, removing stop words and removing noise from the customer feedback data;

loading the cleaned dataset into a semantic knowledge database, including transforming the cleaned dataset into a standardized data structure;

analyzing the semantic knowledge database, using a machine learning algorithm running on the computer, said machine learning algorithm including a natural language processing (NLP) application and a segmentation application, to produce output data; and providing the output data to a set of consumption applications, where the set of consumption applications are utilized by users to identify actionable insights, where the actionable insights include customer sentiments, and clusters of products, services and business segments appearing in the customer feedback data; and wherein the semantic knowledge database is updated by loading a new version of the cleaned dataset, and the updated semantic knowledge database is analyzed by the machine learning algorithm including the NLP application to produce new output data, the semantic knowledge database being updated when an elapsed time from a previous update of the semantic knowledge database exceeds a threshold or a data update triggering event occurs.

9. The method according to claim 8, wherein the multiple input channels include voice of the customer complaints, online chat transcripts, phone call transcripts, social media posts, ratings and comments from mobile application stores and customer feedback provided via third-party businesses.

10. The method according to claim 8, wherein, after identifying actionable insights, the set of consumption applications are utilized by the users to trace the customer sentiments and the clusters of products, services and business segments back to original records in the customer feedback data received from the plurality of external data sources via the multiple input channels.

11. The method according to claim 8, wherein the phone call transcripts are derived from audio data collected during customer phone calls, where a speech signal processing system performs audio transduction on the audio data to generate the phone call transcripts in the form of digital text data.

\* \* \* \* \*